(12) United States Patent
Pulickal Aravindakshan

(10) Patent No.: US 12,511,195 B2
(45) Date of Patent: Dec. 30, 2025

(54) NON-VOLATILE MEMORY EXPRESS TRANSPORT PROTOCOL MESSAGING FOR PARITY GENERATION

(71) Applicant: Microchip Technology Incorporated, Chandler, AZ (US)

(72) Inventor: Anoop Pulickal Aravindakshan, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 14 days.

(21) Appl. No.: 18/611,994

(22) Filed: Mar. 21, 2024

(65) Prior Publication Data

US 2025/0068519 A1  Feb. 27, 2025

(30) Foreign Application Priority Data

Aug. 21, 2023  (IN) .............................. 202311056027

(51) Int. Cl.
*G06F 11/00* (2006.01)
*G06F 11/10* (2006.01)
*G06F 13/42* (2006.01)

(52) U.S. Cl.
CPC ........ *G06F 11/108* (2013.01); *G06F 11/1096* (2013.01); *G06F 13/4221* (2013.01)

(58) Field of Classification Search
CPC ............... G06F 11/108; G06F 11/1096; G06F 11/1076; G06F 13/4221
See application file for complete search history.

(56) References Cited

U.S. PATENT DOCUMENTS

| | | | |
|---|---|---|---|
| 7,546,483 B1* | 6/2009 | Overby | G06F 11/1076 712/34 |
| 10,956,346 B1* | 3/2021 | Ben-Yehuda | G06F 13/4027 |
| 2018/0032265 A1* | 2/2018 | Kotzur | G06F 11/108 |
| 2019/0042361 A1 | 2/2019 | Mcvay et al. | |
| 2020/0050401 A1* | 2/2020 | Gibb | G06F 3/0607 |
| 2021/0271547 A1 | 9/2021 | Bates et al. | |
| 2022/0350755 A1* | 11/2022 | Hahn | G06F 13/4295 |

OTHER PUBLICATIONS

International Search Report and Written Opinion, Application No. PCT/US2024/021419, 13 pages, Jul. 26, 2024.

* cited by examiner

*Primary Examiner* — Joseph D Manoskey
(74) *Attorney, Agent, or Firm* — SLAYDEN GRUBERT BEARD PLLC

(57) ABSTRACT

Methods, devices and systems to communicate an instruction to generate parities from a host processor to an accelerator engine via a nonvolatile memory transport protocol, generate parities from source data via the accelerator engine based on the instruction, and store the generated parities. Methods, devices and systems to generate parities via an accelerator engine on source data from a central processing unit using non-volatile memory transport protocol to communicate a parity generation instruction.

20 Claims, 5 Drawing Sheets

NON-VOLATILE MEMORY EXPRESS TRANSPORT PROTOCOL MESSAGING FOR PARITY GENERATION

CLAIM FOR PRIORITY

The present application claims priority to India patent application Ser. No. 20/231,1056027, filed on 21 Aug. 2023, wherein the entire disclosure is incorporated herein by reference.

TECHNICAL FIELD

The present disclosure relates to offloading computational operations from a host processor, in particular, generating parities via an accelerator engine on source data from a central processing unit using non-volatile memory express (NVMe) transport protocol to communicate a parity generation instruction and direct memory access (DMA) to communicate parities from the accelerator engine to the host processor or other peer PCIe devices.

BACKGROUND

Traditionally, a hardware (HW) redundant array of independent disks (RAID) stack runs on an embedded controller and it has local access to a parity engine to calculate RAID parity. Conventional stacks running in hosts make use of host central processing unit instructions for parity generation, which is a central processing unit (CPU) and memory intensive operation even on powerful x86_64 servers. CPU instructions may take up to two inputs and may not be efficient for larger strips of data. Some server CPU's use advanced vector extension (AVX) instructions which add pressure to host CPU and host dynamic random access memory (DRAM) for any parity calculation operations.

Exclusively-OR (XOR) parity generation is one of the building blocks of RAID algorithms. XOR parity generation is also used in various other operations like error detection, encryption, and pseudo random number generators, without limitation. Software stacks running in host servers, normally use either regular processor instructions or advanced vector instructions like AVX-256 or AVX-512 for XOR operations. Data flows that perform XOR on multiple strips of scattered data buffers, consume significant amount of host processor and memory controller bandwidth to perform this XOR operation. Traditional HW RAID architecture may be a bottleneck for performance when scaling via high-performance nonvolatile memory express (NVMe) drives.

Peripheral Component Interconnect Express (PCIe) is a high-speed serial computer expansion bus standard that replaces the older PCI, PCI-X, and AGP bus standards. PCIe connects the host processor and peripheral PCIe devices, such as NVMe device graphic cards, RAID controllers, without limitation. PCIe uses point-to-point topology, allowing for faster communication between devices. Motherboards and systems that support PCIe, use PCIe devices of different sizes, such as x1, x4, x8, or x16, which refers to the number of lanes they use. PCIe devices connect to the motherboard or system using a PCIe slot so the device may be recognized by the motherboard or system.

Non-volatile memory express (NVMe) is an open, logical-device interface specification for accessing a computer's non-volatile storage media usually attached via the PCIe bus. NVMe may be used with flash memory that comes in PCIe add-in cards.

There is a need for methods and systems to accelerate the generation of parities without burdening a central processing unit.

SUMMARY

Aspects provide methods and systems for generating parities via an accelerator engine connected to a host processor via a peripheral component interconnect express (PCIe) endpoint and using non-volatile memory express (NVMe) transport protocol to communicate a parity generation instruction, wherein the generated parities may be stored in the accelerator engine or communicated via direct memory access (DMA) to memory of the central processing unit or memory of a peer device.

According to an aspect, there is provided a method comprising: providing a host processor; providing an accelerator engine; communicating an instruction to generate parities from the host processor to the accelerator engine via a nonvolatile memory transport protocol; generating parities from source data via the accelerator engine based on the instruction; and storing the generated parities.

Aspects provide a device comprising: a parity generation engine to generate parities based on source data from a host processor; a nonvolatile memory transport protocol controller to receive an instruction from a host processor, wherein the instruction is to initiate parity generation by the parity generation engine; and a direct memory access engine to communicate source data from a host processor to the parity generation engine.

According to an aspect, there is provided a host processor comprising a peripheral component interconnect express (PCIe) endpoint, a nonvolatile memory transport protocol controller, and a DMA engine; an accelerator engine to generate parities, wherein the accelerator engine is connected to the host processor via a peripheral component interconnect express (PCIe) bus, the accelerator engine comprising: dynamic random access memory (DRAM) comprising buffers to store source data from the host processor and to store generated parities; and an integrated circuit comprising: a peripheral component interconnect express (PCIe) endpoint connecting the accelerator engine to the host processor via the PCIe bus; a nonvolatile memory transport protocol controller to receive an instruction from the host processor, wherein the instruction is to initiate parity generation by the parity generation engine; a buffer manager to allocate buffers in the DRAM for source data from the host processor and parities based on the instruction; a parity generation engine to generate parities based on source data from the host processor and to store the parities in allocated buffers in the DRAM; and a direct memory access engine to communicate source data from a host processor to allocated buffers in the DRAM.

BRIEF DESCRIPTION OF THE DRAWINGS

The figures illustrate examples of systems and methods for offloading parity generation, from a central processing unit to an accelerator engine having a PCIe endpoint, using NVMe transport protocol instructions and DMA communications of source data and parities.

Figure 1:
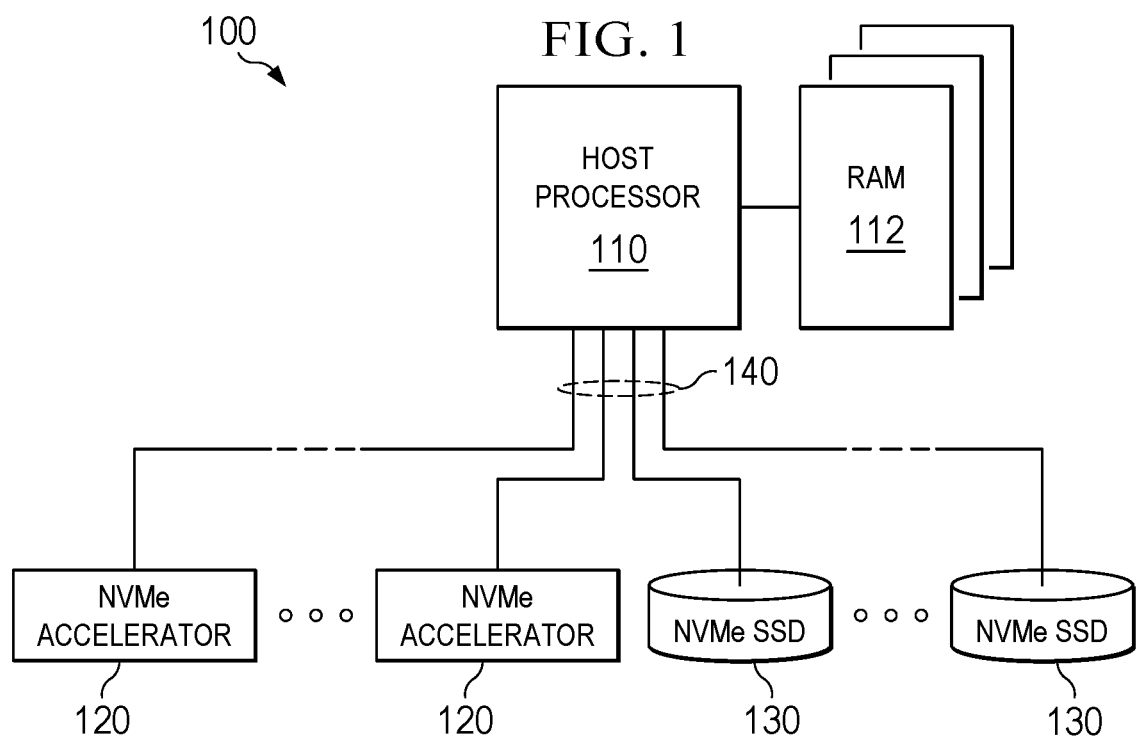
FIG. 1 shows a block diagram of a system for offloading parity generation from a central processing unit to accelerator engines and storage devices over a PCIe bus and using NVMe transport protocol to communicate instructions.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

Aspects provide systems and methods for offloading computational operations for parity generation from a central processing unit to a PCIe endpoint using NVMe transport protocol instruction communications and direct memory access (DMA) data communications. In one aspect, a hardware engine PCIe endpoint offloads parity generation processes from a host processor. A host driver can set up a single NVMe command and send it to an accelerator engine so that parities may be generated by the accelerator engine via a parity generation routine in the accelerator engine. Commands for a parity generation operation may be sent to the accelerator engine, which is an endpoint device, as a vendor defined NVMe command. This vendor defined NVMe command may have a set of a scatter/gather list (SGL) or a physical region page (PRP) as a source buffer and a scatter/gather list (SGL) or a physical region page (PRP) as a destination buffer.

Aspects provide a system and method to generate XOR parity for a number of data strips using an XOR offload engine in an accelerator engine, provided as a PCIe endpoint, by utilizing the NVMe transport protocol and a defined NVMe command for applications running in a processor, such as a host processor or a central processing unit. A dedicated XOR parity generator in the accelerator engine can offload this task from the host processor or central processing unit and host DRAM controllers.

Parity calculations may include RAID applications and may include non-RAID applications. Parity calculations may be required for RAID or non-RAID applications. According to some aspects, an accelerator engine that works over standard transport protocols may provide efficient operation for many applications and use cases. An offload method can be extended to calculate non XOR parities. Built-in support may be added to move data from an accelerator engine to another device, like graphical processing unit (GPU) or NVMe drive, and may provide versatility in some applications.

Systems and methods for offloading computational operations from a processor, such as a host processor or a central processing unit, to a PCIe endpoint using NVMe transport protocol may achieve lower overhead for parity calculations. These systems and methods may free up processor cycles and DRAM for use by remaining applications and processes.

Power requirement may be low for a PCIe Gen-5 x8 ASIC for offloading computational parity generation operations from a processor to a PCIe endpoint using NVMe transport protocol. With certain integrated circuits, a system may achieve up to about 4 GBps data transfer from host to accelerator per lane (28 GBps with 8 lanes).

FIG. 1 shows a block diagram of a system for offloading computational parity generation operations from a processor, such as a host processor, to an accelerator engine, which may be an NVMe accelerator, which NVMe accelerator may be a PCIe endpoint using NVMe transport protocol. The system 100 has a host processor 110 and a random access memory 112 associated with, and coupled to the host processor 110. The random access memory 112 may therefore be termed "host memory". The random access memory 112 may be double data rate (DDR) memory or double data rate synchronous dynamic random access memory (DDR SDRAM), without limitation. The system 100 may also have one or more NVMe accelerators 120 and one or more NVMe solid state devices (SSDs) 130. NVMe accelerators may be examples of accelerator engines described herein. The NVMe solid state devices (SSDs) 130 may use open, logical-device interface specifications for accessing a computer's non-volatile storage media, wherein the specifications may include non-volatile memory express (NVMe) or a non-volatile memory host controller interface specification (NVMHCIS). The NVMe accelerators 120 and NVMe solid state devices (SSDs) 130 may be connected to the host processor 110 via a PCI express bus 140.

Figure 2:
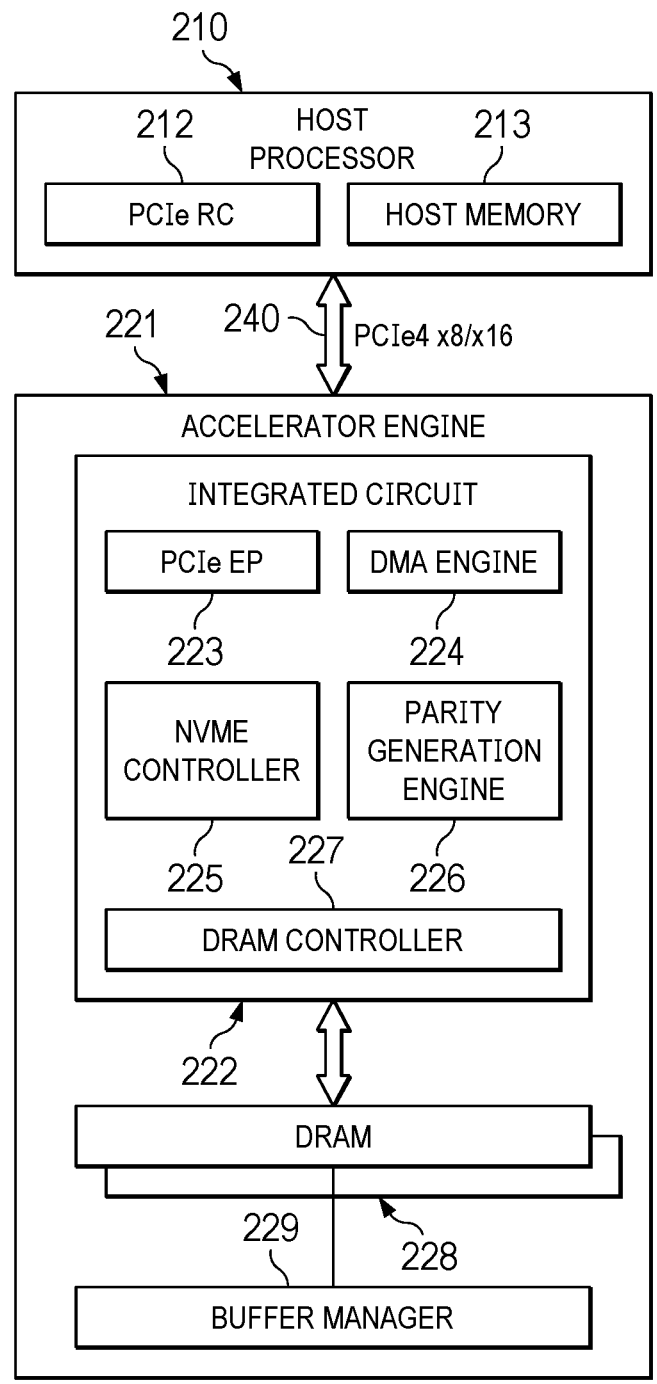
FIG. 2 shows a block diagram of a host processor and an accelerator engine, shown in FIG. 1, the accelerator engine having an ASIC and DRAM.

FIG. 2 shows a block diagram of a host processor 210, which host processor 210 may be an example of the host processor 110 of FIG. 1, and an accelerator engine 221. NVMe accelerator 120 of FIG. 1 may be an example accelerator engine 221 shown in FIG. 1. The host processor 210 has a host memory 213. The host processor 210 has a PCIe root complex 212 and is connected to the accelerator engine 221 via a PCIe bus 240. The accelerator engine 221 has an integrated circuit (IC) 222 and a dynamic random access memory (DRAM) 228, which are connected to each other via a data bus or other connection, without limitation. IC 222 may be an application specific integrated circuit (ASIC). Alternatively, the IC 222 may be a field programmable gate array (FPGA), or any other device, without limitation. The IC 222 has a PCIe end point (EP) 223, a direct memory access (DMA) engine 224, an NVMe controller 225, a parity generation engine 226, and a DRAM controller 227. Alternately, another time of random access memory may be utilized in place of the combination of DRAM 228 and DRAM controller 227. The PCIe end point (EP) 223 provides an endpoint for the PCIe bus 240 connecting to the host 210. The direct memory access (DMA) engine 224 controls DMA communications of data from host random access memory 112 (see FIG. 1) to the accelerator engine 221 and from the accelerator engine 221 to the host random access memory 112. A buffer manager 229 may allocate buffers in the DRAM 228 for source data from the host and parities generated by the parity generation engine 226. The NVMe controller 225 controls communications of messages to, and from, the accelerator engine 221. Parity generation engine 226 may implemented by an XOR engine 226, and may comprise a RAID parity generation routine. The DRAM controller 227 may control dynamic random access memory (DRAM) 228 and read/write of data therein.

Alternatively, a peer NVMe device may be provided, wherein generated parities may be stored in a memory of the peer NVMe device. Alternatively, a destination memory buffer address may belong to a peer PCIe device, and if the destination belongs to a peer PCIe device, the address accelerator may DMA results to a memory of the peer device. Generated parities may be stored in a memory selected from: memory of the host processor 210, memory of a peer device, and DRAM 228 of the accelerator engine.

Figure 3:
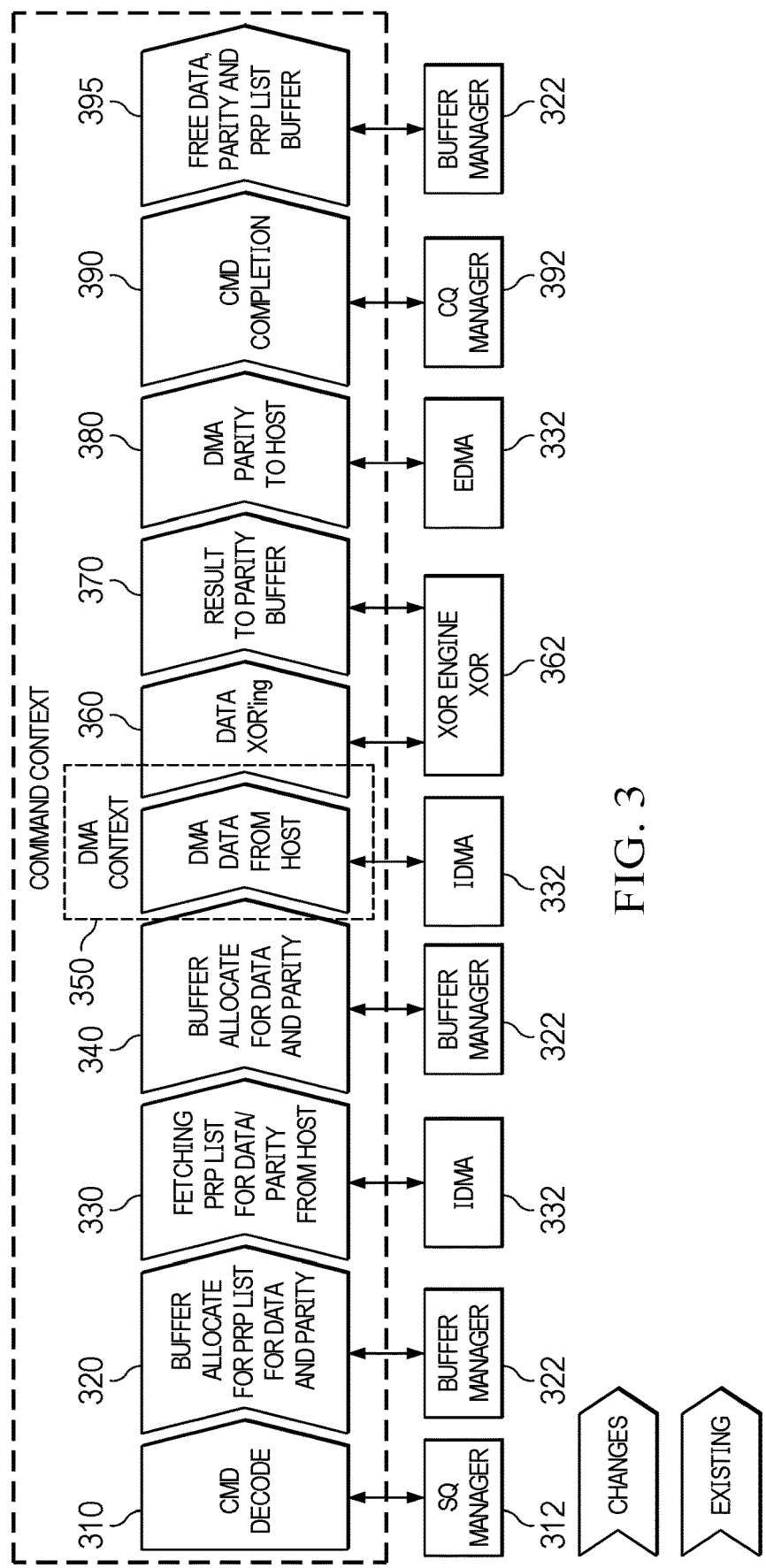
FIG. 3 shows a command context flow running in the ASIC of FIG. 2.

FIG. 3 shows a command context flow running in the IC 222 of FIG. 2. The IC 222 may be an implementation of an NVMe controller to expose a NVMe namespace with an NVMe Input/Output (I/O) command (e.g., XOR Command). The NVMe I/O command may have a list of source and destination buffer pointers in either scatter/gather list (SGL) or physical region page (PRP) formats, which pointers are ways to tell the NVMe SSD 130 (see FIG. 1) memory locations in the DRAM 228 for the source data. A software stack may run on the host processor 110 (see FIG. 1) to send the NVMe I/O command to the DMA engine 224 (sec FIG. 2) with source and destinations buffers in host random access memory 112 (see FIG. 1). On receiving this NVMe I/O command, IC 222 internal operational flow will start, initiate direct memory access (DMA) via the accelerator engine 221 to retrieve source data from the host processor 110 by direct memory accessing source buffers from the host random access memory 112, performing XOR operations, and direct memory accessing results back to host random access memory 112. In particular, the IC 222 internal operational flow may decode 310 the NVMe I/O command via a submission que manager 312. A buffer manager 322 may use the decoded NVMe I/O command to allocate 320 DRAM memory pools in the accelerator engine (for example, buffers) according to a physical region page (PRP) list for source data and generated parity. Alternatively, the buffers may be allocated according to a scatter/gather list (SGL). A DMA engine 332 may fetch 330 the physical region page (PRP) list for data and parity information from host processor 110 by an ingress direct memory access (IDMA). The buffer manager 322 may allocate 340 buffers for the source data and generated parity. The DMA engine 332 may then direct memory access 350 source data from the host random access memory 112 (see FIG. 1) by an ingress direct memory access (IDMA). An XOR engine 362, which may be an example of parity generation engine 226, may then perform 360 XOR operations on the source data and the results may be sent 370 to the buffers allocated for parities. Rather than XOR operations, the parity generation engine may perform any parity operation computation, or it may be a parity generation engine comprising a RAID parity generation routine to generate RAID parities of a redundant array of independent disks (RAID). The DMA engine 332 may send 380 the parities by an egress direct memory access to the host random access memory 112 (sec FIG. 1). A completion que manager 392 may then send 390 a nonvolatile memory express (NVMe) completion command (CMD) to the host. The buffer manager 322 may free 395 the source data buffers, the parity buffers, and the physical region page (PRP) list buffers. The generated parities may be RAID parities.

DRAM controller 227 may provide control for storage of source data from a host processor in dynamic random access memory (DRAM) 228, which include buffers, of accelerator engine 221. Parities generated by parity generation engine 226 may also be stored in DRAM 228, which include buffers, of the accelerator engine 221. The DRAM 228 may be off chip, i.e. DRAM 228 may not be part of IC 222, and may not be a DRAM in communication with accelerator engine 221.

Operational flow may also support Peer to Peer direct memory access (DMA), i.e., DMA to, and from, an accelerator engine can be done by peer PCIe devices instead of DMA performed by the accelerator engine for the flows that involve other peer PCIe devices. Sources of source data may include a host DRAM and a peer PCIe device, without limitation. Destinations for generated results may include a host DRAM, a peer PCIe device, and an accelerator engine, without limitation. Flows of data and messages may include: (1) the accelerator engine receives source data from a host memory and puts generated results back to the host memory; (2) the accelerator engine receives source data from a peer PCIe device and puts generated results in a host processor memory of a peer PCIe device memory; or (3) a first peer PCIe device moves data to the accelerator engine and the accelerator engine keeps the results in its memory and a second peer PCIe device (e.g., an NVMe device) pulls results from the accelerator engine.

An NVMe I/O command (e.g., XOR Command) to expose a NVMe namespace may be as follows.

```
Struct nvme_xor_offload_command {
/**
 * @brief opcode.
 * This field indicates the vendor defined command opcode.
 */
uint32_t Opcode : 8;
/**
 * @brief fusedOp.
 * This field fused Operation.
 */
uint32_t fusedOp : 2;
 * @brief RsvdO.
 * Reserved for future use.
 */
uint32_t RsvdO : 4;
 * @brief PrpSglDataXfer.
 * This field indicates the use of PRP/SGLs for data transfer operations.
 */
uint32_t PrpSglDataXfer : 2;
 * @brief PrpSglDataXfer.
 * command identifier.
 */
uint32_t CmdId : 16;
 * @brief PrpSglDataXfer.
 * Namespace ID.
 */
uint32_t Nsid;
 * @brief Rsvd1.
 * Reserved for future use.
 */
uint32_t Rsvd1 ;
 * @brief StripeSize.
 * This field indicates the stripe size.
 */
uint32_t StripeSize ;
 * @brief MdataPtr.
 * This field indicates the pointer to metadata in host memory.
 */
uint64_t MdataPtr;
/**
 * @brief command parameters.
 * This contains either the PRP list or SG list based on the
PrpSglDataXfer flag.
 * PrpSglDataXfer = 0, PRP list
 *                 =1, SG list
 */
union {
struct {
/**
 * @brief PrpEntry1.
 * Points to first page.
```

```
*/
uint64_t prp_entry1;
/**
* @brief PrpEntry2.
* Points to first page.
*/
uint64_t prp_entry2;
/**
* @brief stripsize.
* stripsize in bytes
*/
Uint32_t stripsize;
/**
* @brief data buffer length.
* data buffer length in bytes.
*/
uint64_t databuffersize;
/**
* @brief dbuff prp entries.
* number of data buffer PRP entries.
*/
Uint32_t dbuff_prp_entries;
/**
* @brief pbuff prp entries.
* number of P buffer PRP entries.
*/
uint64_t pbuff_prp_entries;
/**
* @brief qbuff prp entries.
* number of Q buffer PRP entries.
uint64_t qbuff_prp-entries;
*/
uint64_t qbuff_prp-entries;
} prp-entries;
struct {
/**
* @brief sgdesc.
* first SG desc in the list.
*/
struct nvme_sgl_desc sgbesc;
/**
* @brief stripsize..
* stripsize in bytes.
*/
uint32_t stripsize;
/**
* @brief data buffer length.
* data buffer size in bytes.
*/
uint32_t databuffsize;
/**
* @brief dbuff sg entries in the list.
* number of data buffer SG entries.
*/
uint32_t dbuff_sgl-entries;
/**
* @brief pbuff SG entries.
* number of P buffer SG entries in the list.
*/
uint32_t pbuff_sgl_entries;
/**
* @brief qbuff SG entries.
* number of Q buffer SG entries in the list.
*/
uint32_t qbuff_sgl_entries;
}sgl entries:
/**
* @brief Flags.
* Indicator to specify the location of buffers for DMA operations.
* This is a bit map of 32 bits, each corresponding to a location of a strip.
* It can either be in host memory or controller memory.
* By default all strips are in host memory.
*/
uint32_t Flags.
define NVME_XOR_REQUEST_CMD_OPCODE
0x82 // command opcode for XOR
request command.
]struct nvme_sgl_desc {
uint64_1 Address;
uint32_t Len;
uint8_t Rsvd[3];
uint8_t SgLType;
-];
```

Figure 4:
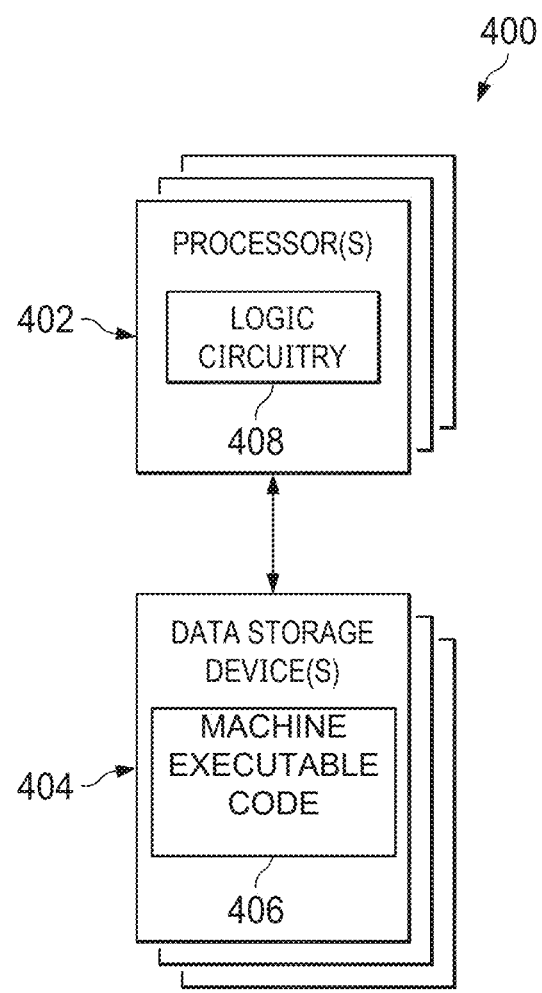
FIG. 4 shows a block diagram of accelerator circuitry that includes one or more processors operably coupled to one or more data storage devices, wherein the ASIC shown in FIG. 2 may be one aspect of the processor and the dynamic random access memory (DRAM) shown in FIG. 2 may be one aspect of the data storage devices.

FIG. 4 is a block diagram of accelerator circuitry 400 that, in some aspects, may be used to implement various functions, operations, acts, processes, and/or methods disclosed herein. The accelerator circuitry 400 includes one or more processors 402 (sometimes referred to herein as "processors 402") operably coupled to one or more data storage devices (sometimes referred to herein as "storage 404"). The integrated circuit (IC) 222 shown in FIG. 2 may be one aspect of the processor 402. The dynamic random access memory (DRAM) 228 shown in FIG. 2 may be one aspect of the storage 404. The storage 404 includes machine executable code 406 stored thereon and the processors 402 include logic circuitry 408. The machine executable code 406 includes information describing functional elements that may be implemented by (e.g., performed by) the logic circuitry 408. The logic circuitry 408 is adapted to implement (e.g., perform) the functional elements described by the machine executable code 406. The accelerator circuitry 400. when executing the functional elements described by the machine executable code 406. may be considered as specific purpose hardware configured for carrying out functional elements disclosed herein. In some aspects, the processors 402 may perform the functional elements described by the machine executable code 402 sequentially. concurrently (e.g., on one or more different hardware platforms), or in one or more parallel process streams.

When implemented by logic circuitry 408 of the processors 402, the machine executable code 406 adapts the processors 402 to perform operations of aspects disclosed herein. For example, the machine executable code 406 may adapt the processors 402 to perform at least a portion or a totality of the command context of FIG. 3. As another example, the machine executable code 506 may adapt the processors 402 to perform at least a portion or a totality of the operations discussed for the IC 222 of FIG. 2. As a specific, non-limiting example, the machine executable code 406 may adapt the processors 402 to perform at least a portion of the parity generation operations discussed herein.

The processors 402 may include a general purpose processor, a specific purpose processor, a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a specific-purpose computer while the general-purpose computer is configured to execute functional elements corresponding to the machine executable code 406 (e.g., software code, firmware code, hardware descriptions) related to aspects of the present disclosure. It is noted that a general-purpose processor (may also be referred to herein as a host processor or simply a host) may be a microprocessor, but in the alternative, the processors 402 may include any conventional processor, controller, microcontroller, or state machine. The processors 402 may also be implemented as a combination of computing devices, such as a combination of a DSP and a microprocessor, a plurality of microprocessors, one or more microprocessors in conjunction with a DSP core, or any other such configuration.

In some aspects, the storage 404 includes volatile data storage (e.g., random-access memory (RAM)), non-volatile data storage (e.g., Flash memory, a hard disc drive, a solid state drive, erasable programmable read-only memory (EPROM), without limitation). In some aspects the processors 402 and the storage 402 may be implemented into a single device (e.g., a semiconductor device product, a system on chip (SOC), without limitation). In some aspects, the processors 402 and the storage 404 may be implemented into separate devices.

In some aspects, the machine executable code 406 may include computer-readable instructions (e.g., software code, firmware code). By way of non-limiting example, the computer-readable instructions may be stored by the storage 404, accessed directly by the processors 402, and executed by the processors 402 using at least the logic circuitry 408. Also, by way of non-limiting example, the computer-readable instructions may be stored on the storage 404, transferred to a memory device (not shown) for execution, and executed by the processors 402 using at least the logic circuitry 408. Accordingly, in some aspects, the logic circuitry 408 includes electrically configurable logic circuitry 408.

In some aspects the machine executable code 406 may describe hardware (e.g., circuitry) to be implemented in the logic circuitry 408 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logie-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 408 may be described in a RTL and then converted by a synthesis tool into a GL description, and the GL description may be converted by a placement and routing tool into a layout-level description that corresponds to a physical layout of an integrated circuit of a programmable logic device. discrete gate or transistor logic. discrete hardware components, or combinations thereof. Accordingly, in some aspects the machine executable code 406 may include an HDL, an RTL, a GL description, a mask level description, other hardware description, or any combination thereof.

In aspects where the machine executable code 406 includes a hardware description (at any level of abstraction), a system (not shown, but including the storage 404) may be configured to implement the hardware description described by the machine executable code 406. By way of non-limiting example, the processors 402 may include a programmable logic device (e.g., an FPGA or a PLC) and the logic circuitry 408 may be electrically controlled to implement circuitry corresponding to the hardware description into the logic circuitry 408. Also, by way of non-limiting example, the logic circuitry 408 may include hard-wired logic manufactured by a manufacturing system (not shown, but including the storage 404) according to the hardware description of the machine executable code 406.

Regardless of whether the machine executable code 406 includes computer-readable instructions or a hardware description, the logic circuitry 408 is adapted to perform the functional elements described by the machine executable code 406 when implementing the functional elements of the machine executable code 406. It is noted that although a hardware description may not directly describe functional elements, a hardware description indirectly describes functional elements that the hardware elements described by the hardware description are capable of performing.

Figure 5:
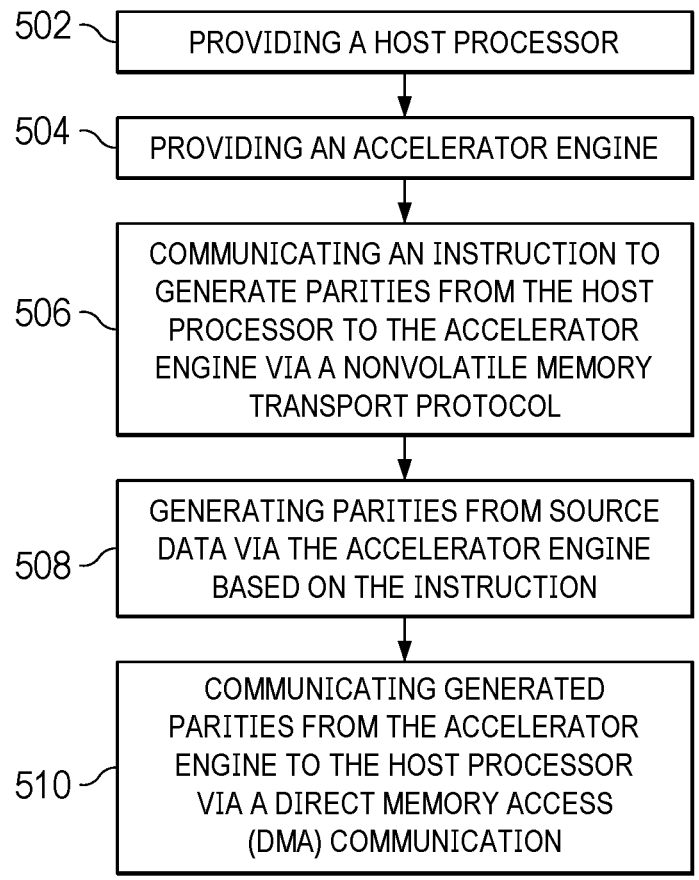
FIG. 5 is a flow chart showing the method for generating parities outside of a central processing unit using NVMe transport protocol to communicate an instruction to generate parities and direct memory access (DMA) to communicate the generated parities to the central processing unit.

FIG. 5 is a flow chart showing the method for generating parities outside of a central processing unit using nonvolatile memory transport protocol to communicate an instruction to generate parities and direct memory access (DMA) to communicate the generated parities to the central processing unit. A host processor is provided 502. An accelerator engine is provided 504. An instruction to generate parities is communicated 506 from the host processor to the accelerator engine via a nonvolatile memory transport protocol. Parities are generated 508 from source data via the accelerator engine based on the instruction. Generated parities may be communicated 510 from the accelerator engine to the random access memory of the host via a direct memory access (DMA) communication. Alternatively, the generated parities may be communicated to a peer NVMe device and saved in memory there, or they may be saved in memory of the accelerator engine. The generated parities may be RAID parities.

Figure 6:
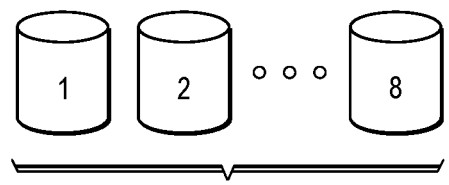
FIG. 6 shows a redundant array of independent disks (RAID).

FIG. 6 shows a redundant array of independent disks (RAID). Parities may be generated for source data stored on the disks. The parities may be RAID parities of the redundant array of independent disks (RAID). The RAID parities may be generated via XOR operations.

Although examples have been described above, other variations and examples may be made from this disclosure without departing from the spirit and scope of these disclosed examples.

The invention claimed is:

1. A method comprising:
providing a host processor;
providing an accelerator engine connected to the host processor via a peripheral component interconnect express (PCIe) bus, wherein the accelerator engine is implemented as a PCIe endpoint;
communicating an instruction to generate parities, wherein communicating the instruction comprises sending, via a nonvolatile memory transport protocol, a nonvolatile memory express (NVMe) Input/Output XOR command from the host processor to the accelerator engine;
generating parities from source data via the accelerator engine based on the instruction; and
storing the generated parities.

2. The method as in claim 1, wherein the instruction comprises a list of source buffer pointers to memory locations for the source data and destination buffer pointers to memory locations for the parities, wherein the source and destination buffer pointers are written in a format selected from scatter/gather list (SGL) or physical region page (PRP).

3. The method as in claim 2, comprising communicating a nonvolatile memory express (NVMe) completion command from the accelerator engine to the host processor after generating parities is complete.

4. The method as in claim 1, comprising initiating direct memory access (DMA) via the accelerator engine to retrieve source data from a host memory.

5. The method as in claim 1, comprising providing a peer NVMe device, wherein communicating the instruction is via the peer NVMe device, and wherein storing the generated parities comprises storing generated parities in a memory of the peer NVMe device.

6. The method as in claim 1, wherein generating parities comprises generating RAID parities of a redundant array of independent disks (RAID) via XOR operations, and wherein the generated parities comprise RAID parities.

7. The method as in claim 1, wherein storing the generated parities comprises storing generated parities in a memory selected from: memory of the central processing unit, memory of a peer device, and memory of the accelerator engine.

8. The method as in claim 2, comprising allocating buffers in the memory for source data from the host processor based on the instruction.

9. A device comprising:
a parity generation engine to generate parities based on source data from a host processor;
a nonvolatile memory transport protocol controller to receive an instruction from a host processor, wherein the instruction comprises a NVMe Input/Output XOR command comprising a list of source buffer pointers to memory locations for the source data and destination buffer pointers to memory locations to store the resultant parity, wherein the instruction is to initiate parity generation by the parity generation engine; and
a direct memory access engine to communicate source data from a host processor to the parity generation engine, and to store the resultant parity to the memory locations listed by the destination buffer pointers.

10. The device as in claim 9, comprising a DRAM controller to control dynamic random access memory (DRAM) to store source data from a host processor and parities generated by the parity generation engine.

11. The device as in claim 9, wherein the transport protocol controller is to send pointers written in a format selected from scatter/gather list (SGL) or physical region page (PRP).

12. The device as in claim 9, wherein the parity generation engine comprises a RAID parity generation routine to generate RAID parities of a redundant array of independent disks (RAID) via XOR operations.

13. The device as in claim 9, wherein the direct memory access engine is to communicate generated parities to a memory selected from: memory of the central processing unit, and memory of a peer device.

14. A system comprising:
a host processor comprising a peripheral component interconnect express (PCIe) endpoint, a nonvolatile memory transport protocol controller, and a DMA engine;
an accelerator engine to generate parities, wherein the accelerator engine is connected to the host processor via a peripheral component interconnect express (PCIe) bus, the accelerator engine comprising:
dynamic random access memory (DRAM) comprising buffers to store source data from the host processor and to store generated parities;
a peripheral component interconnect express (PCIe) endpoint connecting the accelerator engine to the host processor via the PCIe bus;
a nonvolatile memory transport protocol controller to receive an instruction from the host processor, wherein the instruction is to initiate parity generation by the parity generation engine;
a buffer manager to allocate buffers in the DRAM for source data from the host processor and parities based on the instruction;
a parity generation engine to generate parities based on source data from the host processor and to store the parities in allocated buffers in the DRAM; and
a direct memory access engine to communicate source data from the host processor to allocated buffers in the DRAM,
wherein the transport protocol controller is to receive an NVMe instruction comprising a NVMe Input/Output XOR command comprising a list of source buffer pointers to memory locations for the source data in the DRAM and destination buffer pointers to memory locations to store generated parities in the DRAM.

15. The system as in claim 14, wherein the transport protocol controller is to send pointers written in a format selected from scatter/gather list (SGL) or physical region page (PRP).

16. The system as in claim 14, wherein the parity generation engine comprises a RAID parity generation routine to perform XOR operations.

17. The system as in claim 14, wherein the direct memory access engine is to communicate generated parities to a memory selected from: memory of the host processor, and memory of a peer device.

18. The system as in claim 14, wherein the parity generation engine comprises a RAID parity generation routine to generate RAID parities of a redundant array of independent disks (RAID) via XOR operations.

19. The system as in claim 14, wherein the accelerator engine is to communicate a nonvolatile memory express (NVMe) completion command to the host processor after generating parities is complete.

20. The system as in claim 14, wherein the accelerator engine is to initiate direct memory access (DMA) to retrieve source data from a host memory.

* * * * *